United States Patent Office 3,272,342
Patented Sept. 13, 1966

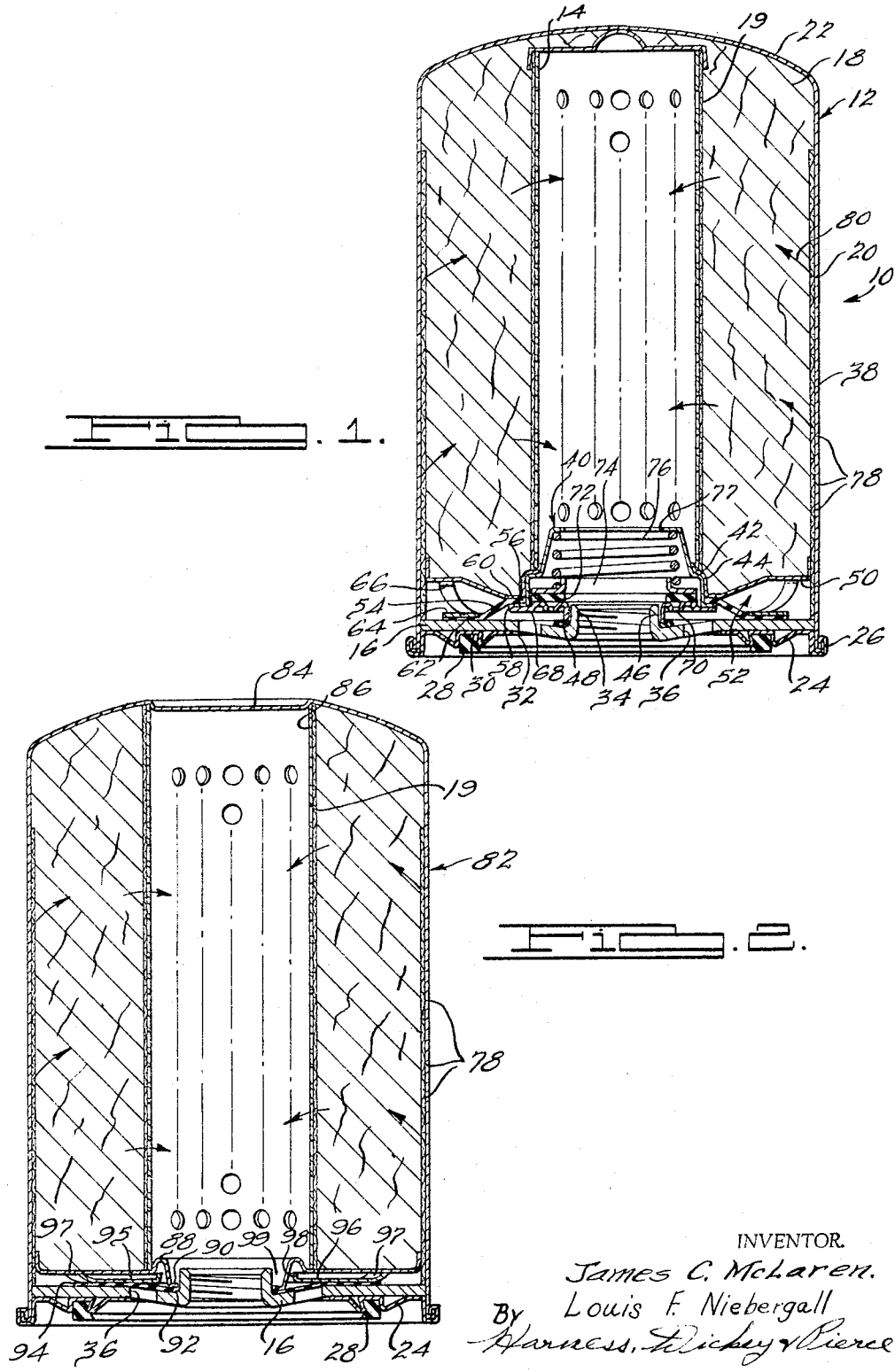

3,272,342
FILTER WITH FLOW DISTRIBUTOR
James C. McLaren and Louis F. Niebergall, Racine, Wis., assignors to Walker Manufacturing Company, a corporation of Delaware
Continuation of application Ser. No. 144,079, Oct. 10, 1961. This application Feb. 19, 1965, Ser. No. 435,783
6 Claims. (Cl. 210—440)

This is a continuation of our Serial No. 144,079, filed on October 10, 1961, now abandoned.

This invention relates to filters and particularly to a disposable type of oil filter having improved filtering characteristics and oil flow pattern.

Heretofore it has been the practice in the oil filtering art to provide a separate housing which contained the filter element and various other parts such as the relief and anti-drainback valves and wherein the filter element was the disposable portion of the filter and the housing was permanent but detachable from the engine to allow the element to be replaced.

The present invention is characterized by the entire filter being disposable and wherein the housing and element are unitary. A wire screen is so located in the filter as to provide a proper oil flow path rendering such a unitary structure feasible.

The main objects of the invention are: to provide an economical disposable filter wherein the housing and filter element are of a unitary construction and readily adapted to machine forming and assembly; to provide a filter wherein a single housing is provided for the entire filter assembly including anti-drainback and relief valves and the filter element; and to provide novel oil passage means which allows the dual use of a single member for the formation of a filter housing and the filter element and which means directs the oil uniformly through substantially all portions of the filter medium.

Further objects, advantages and novel features of the invention will become apparent from the following description taken in conjunction with the drawings wherein:

FIGURE 1 is a longitudinal sectional view of a preferred form of filter adapted for use on automotive engines; and FIG. 2 is a longitudinal sectional view of a modified form of the filter.

In the drawings:

A filter 10 essentially comprises a housing 12, a perforated inner tube 14, an end plate 16, fibrous filtering material 18 such as cotton ram packed to a desired density, and an open-weave cloth covering 19 surrounding the tube and preventing material 18 from migrating through the perforations therein. The housing 12 is formed to provide a side wall 20 and a closed end 22. An annular piece 24 is locked at its periphery 26 to the bottom of the side wall 20 and is provided with a sealing ring 28 locked into a cavity 30 therein and formed with a centrally located aperture 32. The end plate 16 is formed with a threaded tubular portion forming an oil outlet 34 which is adapted to receive a threaded pipe which communicates with the lubricating passages of the engine. A plurality of oil inlets 36 are located in plate 16 radially outwardly of outlet 34. A woven screen 38 of suitable material such as woven galvanized wire or synthetic fabric such as nylon is located inside of the housing 12 and is positioned adjacent the side wall 20 thereof.

A relief valve assembly 40 has its shell formed with a shoulder 42 which engages and forces a cap member 44 in to tight engagement with the end of tube 14. A bottom tubular flange 46 of the relief valve shell fits over the outside of tube 34 and engages a ring seal 48 which is compressed between flange 46 and the end plate 16 to provide a seal. Cap member 44 is formed to provide a ring-shaped surface 50. The relief valve assembly 40 and the radially extending portions of the cap member such as portion 50 are spaced from the end plate 16 to provide a passage 52. A rubber disc 54 is clamped at its inner annular periphery 56 between a flange 58 of the relief valve assembly and a shoulder portion 60 formed on the cap member 44. The outer annular peripheral portion 62 of the rubber member 54 is adapted to seal against the upper surface of the plate 16 and is urged thereagainst by means of a spring having a ring-shaped portion 64 and a plurality of angularly upstanding fingers 66 which engage the surface portion 50 on the cap member 44 and are adapted to slide thereon as the pressure of the oil flowing through inlets 36 become sufficiently great to lift the seal 62 from the plate 16.

The relief valve assembly may comprise a bottom plate 68 having a plurality of relief ports 70 therein which are normally closed by a rubber disc 72 which is resiliently urged against the ports by the annular member 74 and spring 76. When the pressure of the oil such as during initial cold operation of the engine is excessive and the oil cannot be satisfactorily passed through the passage 52 into the filter element the springs 76 will allow the disc 72 to lift off of the port 70 to allow bypass of the viscous oil through the outlet 34 to bypass the filter element. An aperture 77 in the top of the relief valve shell connects the filter element with the oil outlet 34.

During normal operation of the filter when the oil passing through inlet 36 is sufficient to raise the seal 62 from the plate 16 the oil will pass upwardly through the interstices 78 formed by the screen 38 intermediate the wall 20 and filtering material 18. The oil will readily pass through these interstices practically to the top of the filtering material to thereby be distributed throughout the filtering material as shown by the flow arrows 80. The screen 38 thereby serves to provide a distribution type of cavity for the oil in an improved manner over the somewhat analogous cylindrical inlet cavity formed by some conventional types of filters which utilize the separate housing and filter element.

In the modified form of the filter as shown in FIG. 2 the top of housing 32 is provided with an indent 84 around which the inner tube 86 nests,. The annular piece 24, sealing ring 28 and end plate 16 are identical to that shown in FIG. 1. The relief valve of FIG. 1 is eliminated in the structure of FIG. 2 and a cap 88 is provided to form along with the center type 86 and wall 82 and the screen element 38, the cavity in which the filtering material 18 is packed. Cap 88 is provided with a flange 90 which presses the inner portion 92 of a sealing disc 94 against the upper surface of the plate 16 to provide a seal. The disc 94 is engaged by a disc-type of spring 95 having an inner rigid portion 96 and a plurality of spring fingers 97 circumferentially spaced around portion 96. An aperture 93 in spring 96 slides over the downwardly extending portion 99 of the cap 88. Fingers 97 and disc 94 are adapted to be lifted by the oil passing through inlets 36 to allow the oil to flow upwardly through the interstices 78 formed by the screen in the same manner as in FIG. 1. It is noted that the upper ends of the tubes 14 and 86 may be closed by either of the means shown in FIGS. 1 and 2 and the housings 12 and 82 may be identically constructed.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a disposable or throwaway type oil filter, a housing having a side wall and an imperforate end, a plate secured to and closing the other end of said housing, said plate being formed with an oil outlet and an oil inlet, a perforated center tube in said housing having one end closed and the other end open and communicating with said oil outlet, a woven screen in said housing positioned against the side wall thereof along substantially its entire length, a transverse imperforate wall means extending between said center tube and said screen near said other end of the housing to provide a filter chamber therebetween, a depth type filtering material packed in and filling said chamber and pressuring against said center tube, said screen, said wall, and said imperforate closed end of the housing, said wall means being spaced from said other end of the housing to provide oil passage means communicating with said inlet means and lower portions of said screen, said screen providing a network of oil passages extending around and along the outside of said depth type filtering material for rendering the same accessible to said oil.

2. In a disposable or throwaway oil filter, a disposable housing having an imperforate side wall and an imperforate closed end, a plate permanently secured to and closing the other end of the housing, said plate having an oil inlet and an oil outlet formed therein, a perforated center tube in said housing extending substantially the full length thereof and being closed at its end adjacent the imperforate end of the housing, the other end of the center tube being open and connected to said oil outlet, an imperforate transverse wall extending transversely from the open end of said center tube to a point adjacent but spaced inwardly from the inside of said side wall, the space inside said housing between said plate and said wall comprising an oil inlet chamber communicating with said oil inlet and with the transverse space between the transverse wall and the inside of the side wall, an oil flow pervious screen in said housing in contact with the inside of the side wall and filling said transverse space between the transverse wall and the inside of the side wall, said screen extending lengthwise of the housing in contact with said side wall to a point adjacent the imperforate closed end of the housing, the space between said transverse wall and the imperforate end of the housing comprising a filter chamber, said screen providing a network of oil flow passages interconnecting the oil inlet chamber and the filter chamber and extending lengthwise of the filter chamber for substantially the full length thereof, and a mass of depth type filter material packed into and completely filling the filter chamber and pressing against the transverse wall, the imperforate end, the center tube, and pressing against and holding the screen against the inside of the side wall, said screen serving to slightly space the depth type filter material from the side wall, oil being filtered flowing transversely from said screen through the filter material to said center tube.

3. A throw-away type filter cartridge comprised of an annular housing having a side wall and closed at one end thereof by an end wall, an end closure for the other end of said side wall, a fluid inlet passage and a fluid outlet passage formed in said end closure, an annular reticulated member engaging said side wall along the major portion of its length, a depth type filter mass packed into said housing at a spaced distance from said enclosure and in engagement with said recticulated member, a portion of said reticulated member extending beyond said filter mass toward said end closure, means providing for fluid communication between said extending portion of said reticulated member and one of said fluid passages for defining a flow path between said one fluid passage and said filter mass through the interstices of said reticulated member, and means providing a flow path between the other of said flow passages and a portion of said filter mass spaced from said reticulated member.

4. A throw-away type filter cartridge as set forth in claim 3 wherein the flow path between the other flow passage and the filter mass comprises a perforate inner shell around which said filter mass is packed, one end of said perforate inner shell being in fluid communication with said other flow passage.

5. A throw-away type filter cartridge as set forth in claim 3 wherein the reticulated member comprises a wire screen.

6. A throw-away type filter cartridge as set forth in claim 3 wherein the housing side wall is cylindrical in shape and the one end wall thereof is integral with the cylindrical side wall.

References Cited by the Examiner

UNITED STATES PATENTS

| | | | |
|---|---|---|---|
| 185,604 | 12/1876 | Watt | 210—455 |
| 837,845 | 12/1906 | Kiefer | 210—455 |
| 2,179,784 | 11/1939 | Frudden. | |
| 2,196,821 | 4/1940 | Arnold | 210—458 |
| 2,197,252 | 4/1940 | Decker | 210—439 |
| 2,284,447 | 5/1942 | Redner | 210—238 X |
| 2,352,300 | 5/1944 | Walker et al. | 210—455 X |
| 2,452,407 | 10/1948 | Walker | 210—497 X |
| 2,686,154 | 8/1954 | MacNeill | 210—455 X |
| 2,995,249 | 8/1961 | Boewe et al. | |
| 3,044,475 | 7/1962 | Thompson. | |
| 3,173,868 | 3/1965 | Blomquist | 210—455 X |

FOREIGN PATENTS 31,643 12/1933 Netherlands.

REUBEN FRIEDMAN, *Primary Examiner.*

F. W. MEDLEY, *Assistant Examiner.*